United States Patent
Ozawa

(10) Patent No.: US 9,984,258 B2
(45) Date of Patent: May 29, 2018

(54) CARD READER

(71) Applicant: NIDEC SANKYO CORPORATION, Suwa-gun, Nagano (JP)

(72) Inventor: Shigeki Ozawa, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days. days.

(21) Appl. No.: 15/304,977

(22) PCT Filed: Apr. 17, 2015

(86) PCT No.: PCT/JP2015/061858
§ 371 (c)(1),
(2) Date: Oct. 18, 2016

(87) PCT Pub. No.: WO2015/159975
PCT Pub. Date: Oct. 22, 2015

(65) Prior Publication Data
US 2017/0185812 A1    Jun. 29, 2017

(30) Foreign Application Priority Data

Apr. 18, 2014   (JP) ................................ 2014-086083

(51) Int. Cl.
*G06K 7/08*        (2006.01)
(52) U.S. Cl.
CPC ................... *G06K 7/087* (2013.01)
(58) Field of Classification Search
CPC . G06K 7/08; G06K 7/00; G06F 17/00; G07D 11/00; G06Q 40/00; G07F 19/00
USPC ................. 235/449, 375, 379, 486
See application file for complete search history.

(56) References Cited

U.S. PATENT DOCUMENTS

2009/0159687 A1* 6/2009 Clark ................ G07F 7/0873
235/475

FOREIGN PATENT DOCUMENTS

| JP | 2004070476 A | 3/2004 |
| JP | 2011232862 A | 11/2011 |
| WO | 2011093340 A1 | 8/2011 |

OTHER PUBLICATIONS

International Search Report corresponding to Application No. PCT/JP2015/061858; dated May 26, 2015, with English translation.

* cited by examiner

*Primary Examiner* — Edwyn Labaze
(74) *Attorney, Agent, or Firm* — Cantor Colburn LLP

(57) ABSTRACT

A card reader for use with a card may include a card insertion part comprising an insertion port for the card; and an infrared sensor structured to detect a human body and detect movement of a person in front of the card reader. When an inserting direction side of the card inserted into the insertion port is referred to as a rear side and an opposite side to the inserting direction side of the card is referred to as a front side, the card insertion part may include a cut-out part which is cut out toward the rear side from a front end of the card insertion part. The infrared sensor may be disposed so as to face the cut-out part.

20 Claims, 3 Drawing Sheets

CARD READER

CROSS REFERENCE TO RELATED APPLICATIONS

This is the U.S. national stage of application No. PCT/JP2015/061858, filed on Apr. 17, 2015. Priority under 35 U.S.C. § 119(a) and 35 U.S.C. § 365(b) is claimed from Japanese Application No. 2014-086083, filed Apr. 18, 2014, the disclosure of which is incorporated herein by reference.

TECHNICAL FIELD

At least an embodiment of the present invention relates to a card reader structured to perform reading of magnetic data recorded on a card and/or recording magnetic data to a card.

BACKGROUND

Conventionally, a manual type card reader has been known which is structured to perform reading of magnetic data recorded on a card and/or recording magnetic data to a card while a card is manually moved by a user (see, for example, Patent Literature 1). A card reader described in Patent Literature 1 is, as shown in FIGS. 4(A) and 4(B), provided with a card insertion part 103 which is formed with an insertion port 102 for a card 101. The card insertion part 103 is formed in substantially a "U"-shape when viewed in an upper and lower direction and is provided with two protruded parts 103a protruding to a front side. The two protruded parts 103a are formed in a state that a predetermined space is secured therebetween and a cut-out part 103b which is cut out from a front end of the card insertion part 103 toward a rear side is provided between the two protruded parts 103a.

In the card reader described in Patent Literature 1, when a card 101 has been inserted to an internal rear end of the card reader, a part of the card 101 is exposed in the cut-out part 103b so that a user is capable of holding an end part of the card 101 even in a state that the card 101 has been inserted to the internal rear end of the card reader. Therefore, in this card reader, a user is capable of inserting a card 101 to the internal rear end of the card reader in a state that the user holds the end part of the card 101, and is capable of pulling out the card 101 having been inserted to the internal rear end from the card reader.

The card reader described in Patent Literature 1 is, as shown in FIGS. 4(A) and 4(B), provided with a person detecting infrared sensor 104 for detecting movement of a person in front of the card reader. The infrared sensor 104 is disposed in a front face of the card insertion part 103. Further, the card reader includes a pulling-out prevention lever (not shown in FIGS. 4(A) and 4(B)) for preventing a card 101 inserted in an inside of the card reader from being pulled out, and a metal sensor (not shown in FIGS. 4(A) and 4(B)) for detecting a foreign matter including metal material which has been attached to a front face side of the card insertion part 103.

In the card reader described in Patent Literature 1, in a standby state before a card 101 is inserted, the card passage where a card 101 is passed is closed by the pulling-out prevention lever, and a card 101 is unable to be inserted into the card reader. In this state, when a metal sensor does not detect a metal member and the infrared sensor 104 detects movement of a human, the pulling-out prevention lever is set to open the card passage and a card 101 is capable of being inserted.

PATENT LITERATURE

[PTL 1] International publication No. 2011/093340

In recent years, in an industry where a card reader is utilized, so-called phishing has become a large issue where a criminal attaches some device for disturbing pulling-out of a card from an inside of the card reader and illegally acquires the card. In the card reader described in Patent Literature 1, as an arrangement for performing phishing, it is conceivable that, for example, phishing members 106 and 107 are attached to a front face side of the card insertion part 103 as shown in FIGS. 4(A) and 4(B).

Specifically, as an arrangement for phishing, as shown in FIG. 4(A), it is conceivable that a member 106 is formed so as to cover the entire front face of the card insertion part 103 so that a user is unable to hold an end part of a card 101 having been inserted into an inside of the card reader. Further, in a case that the cut-out part 103b is formed in the card insertion part 103 like the card reader described in Patent Literature 1, when only the cut-out part 103b is buried, a user is unable to hold an end part of a card 101 having been inserted into an inside of the card reader. Therefore, as an arrangement for phishing, as shown in FIG. 4(B), it is conceivable that a member 107 is formed so as to bury only the cut-out part 103b of the card insertion part 103 so that a user is unable to hold an end part of a card 101 having been inserted into an inside of the card reader.

In the card reader described in Patent Literature 1, even if the member 106 is attached to the card insertion part 103, the infrared sensor 104 is covered by the member 106 and thus movement of a human in front of the card reader cannot be detected by the infrared sensor 104. Therefore, in this case, a state can be maintained that a card 101 is inhibited from being inserted to the card reader and, as a result, phishing is capable of being prevented.

On the other hand, in the card reader described in Patent Literature 1, in a case that the member 107 is attached to the card insertion part 103, the infrared sensor 104 is not covered by the member 107 and thus movement of a human in front of the card reader can be detected by the infrared sensor 104. Further, in a case that the member 107 is formed of material other than metal, the metal sensor does not detect a metal member. Therefore, in this case, the card passage is opened so that a card 101 can be inserted into the card reader and thus phishing may not be prevented.

SUMMARY

Therefore, in view of the problem described above, at least an embodiment of the present invention provides a card reader having a card insertion part formed with an insertion port for a card, the card reader being capable of preventing phishing even when a phishing member is attached to the card insertion part formed with a cut-out part which is cut out toward a rear side.

To achieve the above, at least an embodiment of the present invention provides a card reader including a card insertion part formed with an insertion port for a card and, when an inserting direction side of the card inserted into the insertion port is referred to as a rear side and an opposite side to the inserting direction side of the card is referred to as a front side, the card reader includes an infrared sensor for detecting a human body configured to detect movement of a person in front of the card reader. The card insertion part is formed with a cut-out part which is cut out toward the rear side from a front end of the card insertion part, and the infrared sensor is disposed so as to face the cut-out part.

In the card reader in accordance with at least an embodiment of the present invention, an infrared sensor is disposed so as to face a cut-out part which is cut out from a front end of a card insertion part toward a rear side. Therefore, according to at least an embodiment of the present invention, for example, when either of the above-mentioned members 106 and 107 is attached to the card insertion part, it can be structured that movement of a person in front of the card reader is unable to be detected by the infrared sensor. Further, in at least an embodiment of the present invention, in a case that movement of a person on a front side of the card reader is not detected by the infrared sensor, phishing is capable of being prevented by performing a predetermined processing, for example, by maintaining the closing state of the card passage where a card is to be passed. Therefore, according to at least an embodiment of the present invention, even when a phishing member is attached to the card insertion part formed with a cut-out part which is cut out toward a rear side, phishing is capable of being prevented.

In at least an embodiment of the present invention, the infrared sensor is a far-infrared sensor. Infrared rays such as near-infrared rays other than far-infrared rays are easily transmitted through material such as resin other than metal in comparison with far infrared rays, but far infrared rays are easily absorbed by material such as resin other than metal. Therefore, for example, even if the members 106 and 107 are formed of material such as resin other than metal, in a case that the infrared sensor is a far-infrared sensor, when the members 106 and 107 are attached to the card insertion part, it can be structured that movement of a person in front of the card reader is unable to be detected by the infrared sensor. Accordingly, in a case that the infrared sensor is a far-infrared sensor, even if a phishing member is formed of material such as resin other than metal, phishing is capable of being prevented.

In at least an embodiment of the present invention, the infrared sensor is disposed so as to face a rear end of the cut-out part. According to this structure, even if a phishing member is formed so as to be disposed only on a rear end side of the cut-out part, when the phishing member is attached to the card insertion part, it can be structured that movement of a person in front of the card reader is unable to be detected by the infrared sensor. Therefore, phishing is capable of being prevented effectively.

In at least an embodiment of the present invention, for example, the card insertion part is formed with two protruded parts protruding toward the front side, the two protruded parts are separately formed from each other with a space therebetween in a width direction of the card which is perpendicular to a thickness direction of the card and an inserting direction of the card inserted into the insertion port, and the cut-out part is formed between the two protruded parts.

In at least an embodiment of the present invention, the card reader includes a control section connected with the infrared sensor, and the control section detects the movement of the person in front of the card reader based on a variation amount every predetermined time of intensity of infrared rays received by the infrared sensor. According to this structure, even if a mechanism structured to radiate a certain amount of infrared rays is provided in a phishing member, when the phishing member is attached to the card insertion part, it can be structured that movement of a person in front of the card reader cannot be detected by the infrared sensor. Therefore, phishing is capable of being effectively prevented.

In at least an embodiment of the present invention, for example, the card reader includes a shutter mechanism structured to close the card passage where the card is passed, and a control section with which the infrared sensor and the shutter mechanism are connected, and the control section controls the shutter mechanism based on a detected result of the infrared sensor. In this case, the card reader includes an insertion detection mechanism structured to detect that the card is inserted into the insertion port, the insertion detection mechanism is connected with the control section and, in a standby state before the card is inserted into the insertion port, the shutter mechanism closes the card passage and when the control section detects that the card is inserted into the insertion port based on a detected result of the insertion detection mechanism and that the movement of the person in front of the card reader is detected based on a detected result of the infrared sensor, the control section releases a closing state of the card passage by the shutter mechanism and opens the card passage. According to this structure, in a case that a phishing member is attached to the card insertion part and thus, movement of a person in front of the card reader is unable to be detected by the infrared sensor, even when it is detected that a card is inserted into the insertion port, a closing state of the card passage is maintained and the card cannot be inserted into the card reader. Therefore, phishing is capable of being surely prevented.

A card reader in at least an embodiment of the present invention includes a card insertion part formed with an insertion port for a card and, when an inserting direction side of the card inserted into the insertion port is referred to as a rear side and an opposite side to the inserting direction side of the card is referred to as a front side, the card reader includes an infrared sensor for detecting a human body configured to detect movement of a person in front of the card reader, and a protruded part which is provided on at least one end side of the card insertion part in a card width direction perpendicular to an inserting direction of the card and is protruded toward the front side of the card insertion part. The protruded part forms a holding space for holding the card by a user of the card reader, and a detection area of the infrared sensor is restricted by the protruded part on at least one end side of the card insertion part in the card width direction.

In the card reader in accordance with at least an embodiment of the present invention, a detection area of the infrared sensor is restricted by the protruded part on at least one end side of the card insertion part in the card width direction. Therefore, according to at least an embodiment of the present invention, in a case that a phishing member is attached to a holding space for a card, it can be structured that movement of a person in front of the card reader is unable to be detected by the infrared sensor. Accordingly, in a case that movement of a person on a front side of the card reader is not detected by the infrared sensor, it can be effectively determined that a phishing member is existed in the holding space and thus phishing can be prevented.

In at least an embodiment of the present invention, for example, the protruded part is formed on both end sides of the card insertion part in the card width direction, and the detection area of the infrared sensor is restricted by the protruded parts on both end sides of the card insertion part in the card width direction.

In at least an embodiment of the present invention, the card reader includes an insertion detection mechanism structured to detect that the card is inserted into the insertion port, and a control section connected with the infrared sensor and the insertion detection mechanism, the control section detects the movement of the person in front of the card reader based on a variation amount every predetermined time of intensity of infrared rays received by the infrared sensor, the control section determines that a foreign matter covering the holding space is existed in a case that, when the control section detects that the card is inserted into the insertion port based on a detected result of the insertion detection mechanism, the control section does not detect the movement of the person in front of the card reader based on a detected result of the infrared sensor. According to this structure, in a case that it is determined that a foreign matter which covers the holding space is existed when a user for the card reader is inserting a card, an insertion of a card to the card insertion port can be prevented by performing a predetermined processing, for example, by maintaining the closing state of the card passage where a card is passed. Therefore, according to at least an embodiment of the present invention, in a case that a phishing member is attached in a holding space for a card, phishing is capable of being prevented.

As described above, according to at least an embodiment of the present invention, in the card reader provided with a card insertion part formed with an insertion port for a card, even when a phishing member is attached to the card insertion part formed with a cut-out part which is cut out toward a rear side, phishing is capable of being prevented.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will be described below with reference to the accompanying drawings.

(Schematic Structure of Card Reader)

Figure 1:
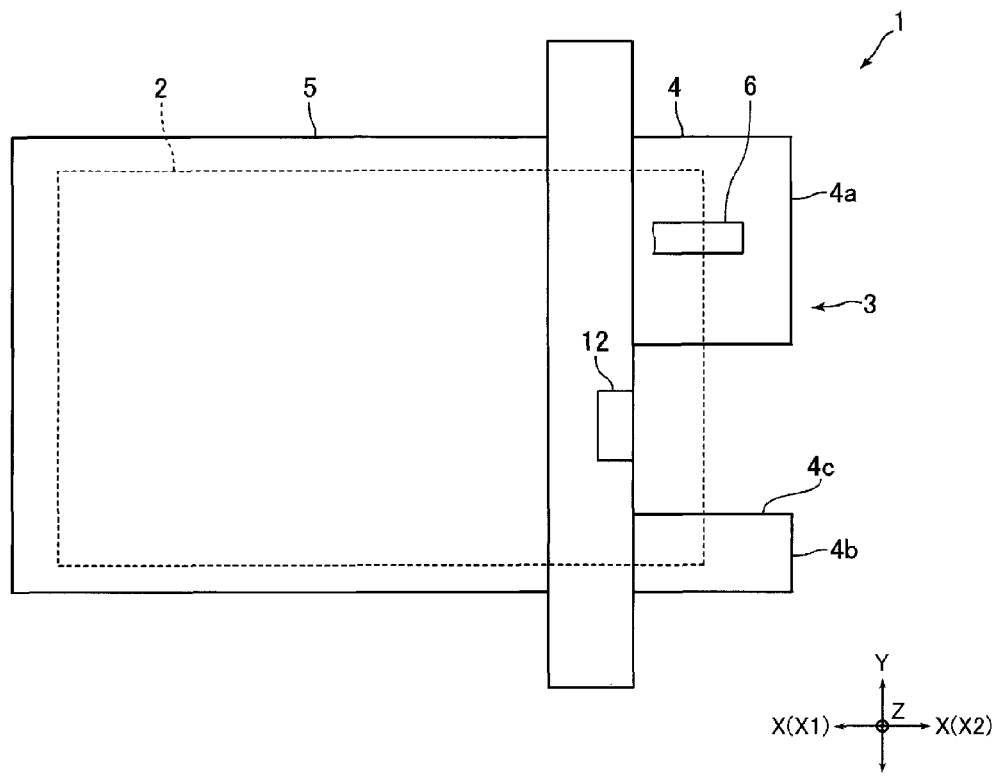
FIG. 1 is an explanatory plan view showing a schematic structure of a card reader in accordance with an embodiment of the present invention.
Figure 2:
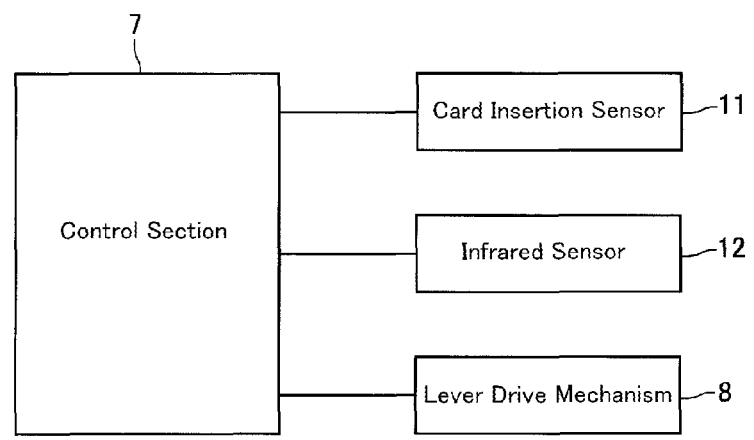
FIG. 2 is a block diagram showing a structure relating to card inserting operation in the card reader shown in FIG. 1.

FIG. 1 is an explanatory plan view showing a schematic structure of a card reader 1 in accordance with an embodiment of the present invention. FIG. 2 is a block diagram showing a structure relating to card inserting operation in the card reader 1 shown in FIG. 1.

A card reader 1 in this embodiment is a device structured to perform reading of data recorded in a card 2 and/or recording data to a card 2. The card reader 1 is mounted and used in a predetermined host apparatus. Further, the card reader 1 is a manual type card reader structured so that an insertion of a card 2 to the card reader 1 and pulling-out of the card 2 from the card reader 1 are performed manually. Specifically, the card reader 1 is a so-called dip-type card reader. The card reader 1 includes a card insertion part 4 formed with an insertion port 3 for a card 2 and a main body part 5. A card passage where a card 2 is passed is formed in an inside of the card reader 1. The card passage is formed so as to be connected with the insertion port 3. Further, the card reader 1 includes a pulling-out prevention lever 6 configured to prevent pulling-out of a card 2 inserted into the card reader 1 and a control section 7 of the card reader 1.

In this embodiment, a card 2 is passed in the "X" direction in FIG. 1. Specifically, a card 2 is inserted in the "X1" direction in FIG. 1 and the card 2 is pulled out in the "X2" direction in FIG. 1. In other words, the "X1" direction is an inserting direction of a card 2 inserted into the insertion port 3, and the "X2" direction is a pulling-out direction of the card 2. Further, the "Z" direction in FIG. 1 perpendicular to the "X" direction is a thickness direction of a card 2 inserted into the insertion port 3, and the "Y" direction in FIG. 1 perpendicular to the "X" direction and the "Z" direction is a width direction (short width direction) of a card 2 inserted into the insertion port 3. In the following descriptions, the "X1" direction side is referred to as a "rear (back) side", and the "X2" direction side is referred to as a "front" side. Further, the "X" direction is referred to as a front and rear direction, the "Y" direction is referred to as a right and left direction, and the "Z" direction is referred to as an upper and lower direction.

A card 2 is, for example, a rectangular card made of vinyl chloride whose thickness is about 0.7-0.8 mm. The card 2 is incorporated with an IC chip and a surface of the card 2 is formed with an external connection terminal of the IC chip. Further, the card 2 is formed with a magnetic stripe in which magnetic data are recorded. In other words, the card 2 in this embodiment is a contact type IC card with a magnetic stripe. The card 2 may be a non-contact type IC card. Further, the card 2 may be incorporated with no IC chip or may be formed with no magnetic stripe. Further, the card 2 may be a PET (polyethylene terephthalate) card whose thickness is about 0.18-0.36 mm and may be a paper card having a predetermined thickness.

An inside of the main body part 5 is arranged with a magnetic head (not shown) configured to perform reading of magnetic data recorded on a card 2 and/or recording of magnetic data to a card 2, and an IC contact block (not shown) having IC contact points configured to contact with an external connection terminal of a card 2 for communicating with its IC chip. The card insertion part 4 is fixed to a front end of the main body part 5 and structures a front side portion of the card reader 1. A specific structure of the card insertion part 4 will be described below.

The pulling-out prevention lever 6 is turnably supported by a fixed shaft not shown. The fixed shaft is fixed to a frame of the main body part 5 so that its axial direction and the right and left direction are coincided with each other. Further, the pulling-out prevention lever 6 is connected with a lever drive mechanism 8 structured to turn the pulling-out prevention lever 6 around the fixed shaft. The lever drive mechanism 8 includes a drive source (not shown) such as a solenoid, a power transmission mechanism (not shown) structured to transmit power of the drive source to the pulling-out prevention lever 6 and the like. The lever drive mechanism 8 (specifically, the drive source structuring the lever drive mechanism 8) is connected with the control section 7.

A front end side portion of the pulling-out prevention lever 6 is disposed in an inside of the card insertion part 4. The pulling-out prevention lever 6 is turnable between a closing position where a front end side portion of the pulling-out prevention lever 6 closes the card passage and an open position where the front end side portion of the pulling-out prevention lever 6 releases the closing state of the card passage to open the card passage. In this embodiment, a shutter mechanism for closing the card passage is structured of the pulling-out prevention lever 6 and the lever drive mechanism 8.

(Structure of Card Insertion Part)

The card insertion part 4 is provided with two protruded parts 4a and 4b which are protruded toward a front side. The two protruded parts 4a and 4b are formed in a state with a predetermined space therebetween in the right and left direction. In this embodiment, the protruded parts 4a and 4b are disposed on both respective end sides of the card insertion part 4 in the right and left direction and the card insertion part 4 is formed in a substantially "U"-shape when viewed in the upper and lower direction.

A cut-out part 4c which is cut out from a front end of the card insertion part 4 toward a rear side is provided between the two protruded parts 4a and 4b. In other words, the card insertion part 4 is formed with the cut-out part 4c which is cut out toward a rear side from a front end of the card insertion part 4 (in other words, a recessed part recessed toward a rear side from the front end of the card insertion part 4). The cut-out part 4c is formed in a substantially rectangular groove shape or a substantially "U"-shape whose front end side is opened when viewed in the upper and lower direction. A width in the right and left direction of the cut-out part 4c is set to be a size which is capable of accommodating fingers of a user of the card reader 1. In other words, a space formed by the cut-out part 4c is a holding space for a card 2. In a state that a card 2 has been inserted into the card insertion part 4, a part of an end part of the card 2 is exposed from the cut-out part 4c and a user is capable of easily holding the card. A user of the card reader 1 puts his/her fingers in the holding space and holds the card 2 and performs an insertion and pulling-out of the card 2.

An inside of the card insertion part 4 is disposed with a card insertion sensor 11 and a card insertion detection lever (not shown) for detecting a card 2 inserted into the insertion port 3. The card insertion sensor 11 is, for example, an optical type sensor having a light emitting element and a light receiving element. The card insertion sensor 11 is connected with the control section 7. The card insertion detection lever is, for example, disposed at a position where a rear end side of a card 2 inserted into the insertion port 3 is contacted.

In this embodiment, when a card 2 is inserted into the insertion port 3, the card insertion detection lever is turned and intercepts between a light emitting element and a light receiving element of the card insertion sensor 11 and thus, based on a detected result of the card insertion sensor 11, it is detected that the card 2 is inserted into the insertion port 3. In other words, the control section 7 detects that the card 2 has been inserted into the insertion port 3 based on a detected result of the card insertion sensor 11. Further, in this embodiment, an insertion detection mechanism for detecting that a card 2 has been inserted into the insertion port 3 is structured of the card insertion sensor 11 and the card insertion detection lever. In accordance with an embodiment of the present invention, for example, an insertion detection mechanism for detecting that a card 2 having been inserted into the insertion port 3 may be structured of an optical type sensor having a light emitting element and a light receiving element disposed so as to interpose the card passage therebetween in the upper and lower direction.

The inside of the card insertion part 4 is disposed with an infrared sensor 12 for detecting a person which is configured to detect movement of a person in front of the card reader 1. The infrared sensor 12 is disposed so as to face the cut-out part 4c. In this embodiment, the infrared sensor 12 is disposed so as to face a rear end of the cut-out part 4c. Specifically, an opening part is formed at a rear end of the cut-out part 4c of the card insertion part 4 and a light receiving part of the infrared sensor 12 is disposed in the opening part. Further, the infrared sensor 12 is disposed to an upper side or a lower side of the card passage. Further, a detection area of the infrared sensor 12 is restricted in the right and left direction by the protruded parts 4a and 4b and is enlarged toward a substantially front side of the cut-out part 4c.

The infrared sensor 12 is, for example, a pyroelectric type infrared sensor and is provided with a pyroelectric element configured to detect light including infrared rays by a pyroelectric effect. Further, the infrared sensor 12 in this embodiment is a far infrared sensor configured to detect far infrared rays which are radiated by an object. The infrared sensor 12 is connected with the control section 7. The infrared sensor 12 detects a difference between temperature of an object in front of the card reader 1 and an ambient temperature of the object within a detection area of the infrared sensor 12 based on infrared rays (specifically, far infrared rays) radiated by the object in front of the card reader 1.

The control section 7 detects movement of a person in front of the card reader 1 based on a detected result of the infrared sensor 12. Specifically, the control section 7 detects whether a person is moving in front of the card reader 1 or not based on a variation amount, determined at predetermined intervals of a difference between temperature of an object in front of the card reader 1 and an ambient temperature of the object within a detection area of the infrared sensor 12. In other words, the control section 7 detects whether a person is moving in front of the card reader 1 or not based on a variation amount, determined at predetermined intervals, of intensity of infrared rays (specifically, far infrared rays) received by the infrared sensor 12.

(Card Inserting Operation in Card Reader)

In the card reader 1 structured as described above, in a standby state before a card 2 is inserted into the insertion port 3, the pulling-out prevention lever 6 closes the card passage so that an insertion of a card 2 to the card reader 1 is not allowed. In this state, when an insertion of a card 2 into the insertion port 3 is detected based on a detected result of the card insertion sensor 11 and, in addition, movement of a person in front of the card reader 1 is detected based on a detected result of the infrared sensor 12, the control section 7 drives the lever drive mechanism 8 so that the closing state of the card passage by the pulling-out prevention lever 6 is released and the card passage is opened. When the card passage is opened, an insertion of a card 2 to the inside of the card reader 1 is allowed.

Figure 3A:
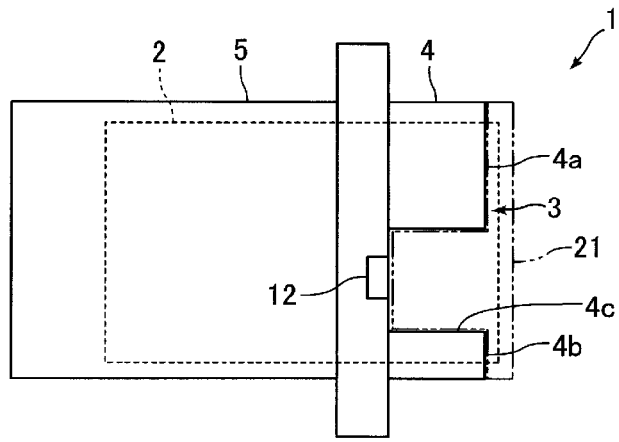
FIGS. 3(A), 3(B) and 3(C) are plan views showing states when a phishing member is attached to the card reader shown in FIG. 1.
Figure 3B:
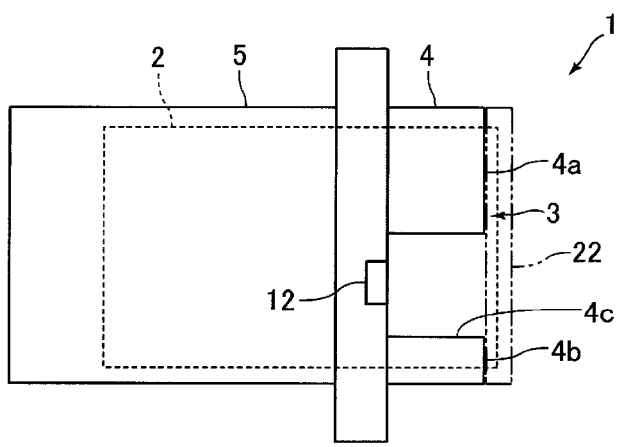
Figure 3C:
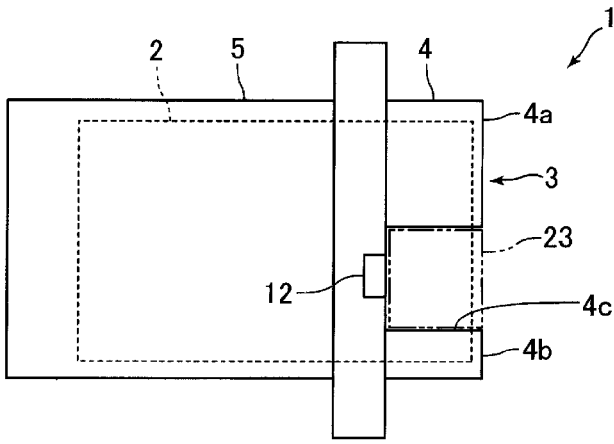
Figure 4A:
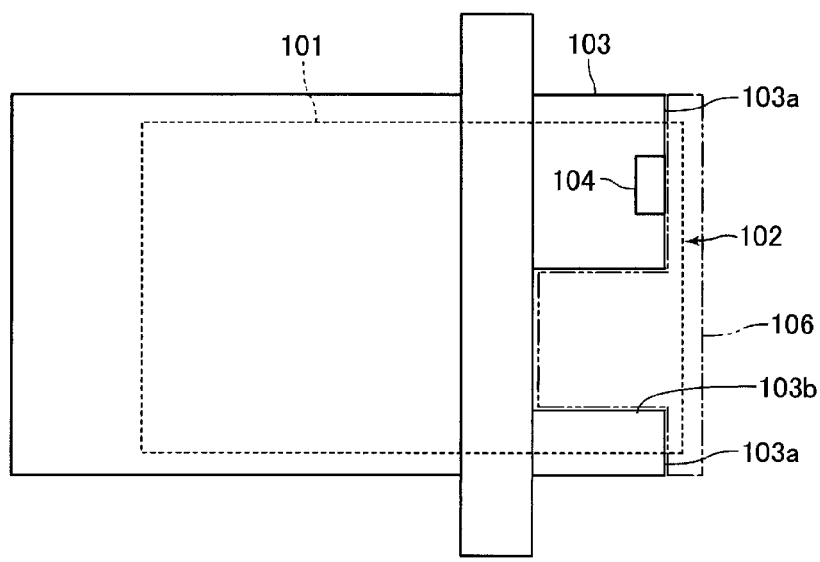
FIGS. 4(A) and 4(B) are views for explaining problems of a conventional card reader.
Figure 4B:
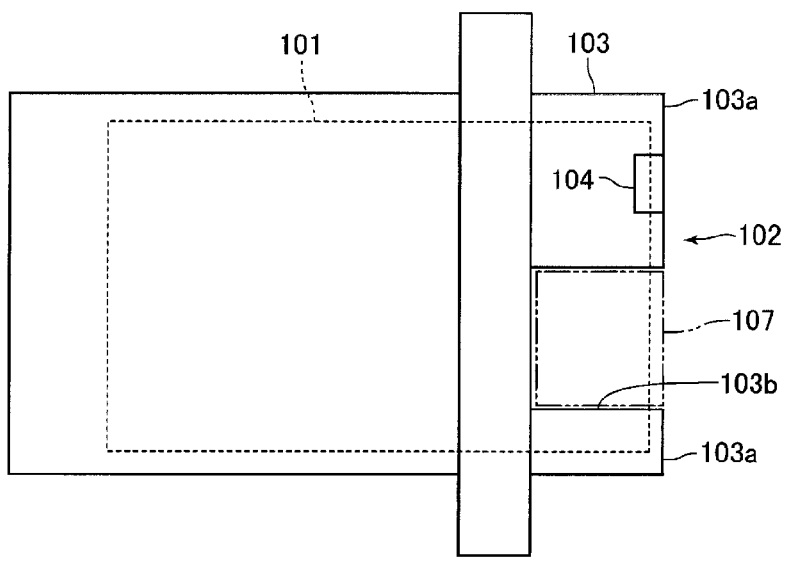

In the card reader 1, for example, if phishing members 21 through 23 shown in FIGS. 3(A), 3(B) and 3(C) are attached to a front face side of the card insertion part 4 by a criminal so that a user is unable to hold an end part of a card 2 having been inserted to a rear end in the inside of the card reader 1, the infrared sensor 12 is covered by the members 21 through 23 and thus movement of a person in front of the card reader 1 is unable to be detected by the infrared sensor 12. In this embodiment, even when an insertion of a card 2 into the insertion port 3 is detected based on a detected result of the card insertion sensor 11, when movement of a person in front of the card reader 1 is not detected based on a detected result of the infrared sensor 12, the control section 7 maintains the closing state of the card passage by the pulling-out prevention lever 6.

In other words, in this embodiment, even when an insertion of a card 2 into the insertion port 3 is detected based on a detected result of the card insertion sensor 11, if movement of a person in front of the card reader 1 is not detected based on a detected result of the infrared sensor 12, the control section 7 determines that phishing members 21 through 23 have been attached to the front face side of the card insertion part 4 and prevents insertion of a card 2 by a user to the inside of the card reader 1. Further, in this case, the control section 7 transmits, for example, an abnormal signal for notifying that abnormality has been occurred to its host apparatus. The host apparatus having received the abnormal signal performs a predetermined operation, for example, indicates abnormality on a display of the host apparatus or sound a buzzer to notify the abnormality to a user.

The member 21 is, as shown in FIG. 3(A), formed so as to cover the entire front face of the card insertion part 4 and bury the cut-out part 4c. The member 22 is, as shown in FIG. 3(B), formed so as to cover the entire front face of the card insertion part 4 but with no portion for burying the cut-out part 4c. The member 23 is, as shown in FIG. 3(C), formed so as to bury only the cut-out part 4c.

(Principal Effects in this Embodiment)

As described above, in this embodiment, the infrared sensor 12 is disposed so as to face the cut-out part 4c which is cut out from the front end of the card insertion part 4 toward a rear side. Therefore, according to this embodiment, for example, even if any member of the phishing members 21 through 23 is attached to the front face side of the card insertion part 4, as described above, movement of a person in front of the card reader 1 is unable to be detected by the infrared sensor 12. Further, in this embodiment, even when it is detected that a card 2 has been inserted into the insertion port 3 based on a detected result of the card insertion sensor 11, if movement of a person in front of the card reader 1 is not detected based on a detected result of the infrared sensor 12, the control section 7 maintains the closing state of the card passage by the pulling-out prevention lever 6 and an insertion of a card 2 by a user to the inside of the card reader 1 is prevented. Further, even when it is detected that a card 2 has been inserted into the insertion port 3 based on a detected result of the card insertion sensor 11, if movement of a person in front of the card reader 1 is not detected based on a detected result of the infrared sensor 12, the control section 7 transmits an abnormal signal for notifying that abnormality has been occurred to its host apparatus, and the host apparatus having received the abnormal signal performs a predetermined operation to notify occurrence of the abnormality to a user. Therefore, according to this embodiment, phishing is capable of being prevented. In other words, in a case that movement of a person on a front side of the card reader 1 is not detected by the infrared sensor 12, it can be effectively determined that a phishing member has been attached in the holding space and thus phishing is capable of being prevented by maintaining the closing state of the card passage where a card 2 is to be passed and/or by performing a predetermined processing, for example, giving an alarm. Therefore, according to this embodiment, even when a phishing member is attached to the holding space for a card, phishing is capable of being prevented.

Especially, in this embodiment, the infrared sensor 12 is disposed so as to face a rear end of the cut-out part 4c and thus, even if a phishing member is formed so as to be disposed only on a rear end side of the cut-out part 4c, when the phishing member is attached to the card insertion part 4, movement of a person in front of the card reader 1 is unable to be detected by the infrared sensor 12. Therefore, according to this embodiment, phishing is capable of being effectively prevented.

In this embodiment, the infrared sensor 12 is a far-infrared sensor. Further, infrared rays such as near-infrared rays other than far-infrared rays are easily transmitted through material such as resin other than metal in comparison with far infrared rays, but far infrared rays are easily absorbed by material such as resin other than metal. Therefore, according to this embodiment, even in a case that the members 21 through 23 are, for example, formed of material such as resin other than metal, when the members 21 through 23 are attached to the front face side of the card insertion part 4, movement of a person in front of the card reader 1 is unable to be detected by the infrared sensor 12. Accordingly, in this embodiment, even if the members 21 through 23 are formed of material such as resin other than metal, phishing is capable of being prevented. Especially, in this embodiment, a detection area of the infrared sensor 12 is restricted in the right and left direction by the protruded parts 4a and 4b and is enlarged toward a substantially front side of the cut-out part 4c. Therefore, a variation of a situation, that is, movement of a person cannot be detected in the cut-out part 4c can be determined effectively.

In this embodiment, the control section 7 detects whether a person is moving in front of the card reader 1 or not based on a variation amount, determined at predetermined intervals, of far infrared rays received by the infrared sensor 12. Therefore, in this embodiment, for example, even if a mechanism structured to radiate a certain amount of far-infrared rays is provided in the phishing members 21 through 23, when the members 21 through 23 have been attached to the card insertion part 4, movement of a person in front of the card reader 1 cannot be detected by the infrared sensor 12. Accordingly, in this embodiment, phishing is capable of being effectively prevented.

Other Embodiments

Although the present invention has been shown and described with reference to a specific embodiment, various changes and modifications will be apparent to those skilled in the art from the teachings herein.

In the embodiment described above, the infrared sensor 12 is disposed so as to face a rear end of the cut-out part 4c. However, the infrared sensor 12 may be disposed so as not to face a rear end of the cut-out part 4c. For example, the infrared sensor 12 may be disposed so as to face one of right and left side faces of the cut-out part 4c.

In the embodiment described above, one infrared sensor 12 is disposed in the inside of the card insertion part 4. However, two or more infrared sensors 12 may be disposed in the inside of the card insertion part 4. In this case, when there is a distinct difference between outputs of two or more infrared sensors 12, the control section 7 determines that the phishing members 21 through 23 have been attached to the front face side of the card insertion part 4 and prevents insertion of a card 2 by a user to the inside of the card reader 1 and/or transmits an abnormal signal to the host apparatus for notifying that abnormality has been occurred.

In the embodiment described above, the card insertion part 4 is formed in a substantially "U"-shape when viewed in the upper and lower direction, and the card insertion part 4 is formed with two protruded parts 4a and 4b protruding to the front side. However, the present invention is not limited to this embodiment. For example, one protruded part may be formed in the card insertion part 4. In other words, the card insertion part 4 may be formed in a substantially "L"-shape or a substantially "T"-shape when viewed in the upper and lower direction. For example, the card insertion part 4 is formed with the protruded part 4a but with no protruded part 4b. In this case, a portion of the card insertion part 4 where the protruded part 4a is not formed is a cut-out part 4c and the infrared sensor 12 is disposed so as to face the cut-out part 4c. In addition, in this case, when the infrared sensor 12 is disposed so as to face a rear end of the cut-out part 4c, a detection area of the infrared sensor 12 is restricted by the protruded part 4a in a direction where the protruded part 4a is formed when viewed in the upper and lower direction and is enlarged toward a direction where the protruded part 4a is not formed and toward a substantially front side of the cut-out part 4c. Further, three or more protruded parts may be formed in the card insertion part 4.

In the embodiment described above, an electrostatic capacitance sensor may be disposed in the inside of the card insertion part 4 instead of the infrared sensor or together with the infrared sensor. In this case, based on a detected result of the electrostatic capacitance sensor, it can be detected directly that the phishing members 21 through 23 have been attached to the card insertion part 4. When the infrared sensor 12 and the electrostatic capacitance sensor are used, phishing can be prevented further effectively.

However, when a distance between the electrostatic capacitance sensor and the members 21 through 23 becomes larger, it is difficult to detect that the members 21 through 23 have been attached to the card insertion part 4 based on a detected result of the electrostatic capacitance sensor. Further, a level of an output signal of an electrostatic capacitance sensor varies due to influence of rainwater and thus, in a case that the card reader 1 is used outdoors, an erroneous detection that the members 21 through 23 have been attached to the card insertion part 4 may be occurred on rainy days or the like. In addition, it is assumed that the members 21 through 23 are formed in various shapes and of various materials. Therefore, it is required to appropriately adjust a threshold value of an electrostatic capacitance sensor depending on an external situation and a fraudulent member to be assumed.

In the embodiment described above, the infrared sensor 12 is a far-infrared sensor but the infrared sensor 12 may be, for example, a reflection type near-infrared sensor. Also in this case, if the phishing members 21 through 23 are formed of material absorbing near-infrared rays, when the members 21 through 23 are attached to the front face side of the card insertion part 4, the infrared sensor 12 is unable to detect movement of a person in front of the card reader 1.

In the embodiment described above, the control section 7 detects whether a person is moving in front of the card reader 1 or not based on a variation amount, determined at predetermined intervals, of intensity of far infrared rays received by the infrared sensor 12. However, the present invention is not limited to this embodiment. For example, the control section 7 may detect whether a person is moving in front of the card reader 1 based on the intensity of the far-infrared rays received by the infrared sensor 12 at a time when it is detected that a card 2 is inserted into the insertion port 3.

In the embodiment described above, the card reader 1 includes a card insertion sensor 11 and a card insertion detection lever as an insertion detection mechanism structured to detect a card 2 inserted into the insertion port 3. However, the card reader 1 may include no insertion detection mechanism. In this case, it may be structured that, when movement of a person in front of the card reader 1 is detected based on a detected result of the infrared sensor 12, the closing state of the card passage by the pulling-out prevention lever 6 is released to open the card passage.

In the embodiment described above, in a standby state before a card 2 is inserted into the insertion port 3, the pulling-out prevention lever 6 closes the card passage. However, the present invention is not limited to this embodiment. For example, in a standby state before a card 2 is inserted into the insertion port 3, the pulling-out prevention lever 6 may open the card passage. In this case, when it is detected that a card 2 has been inserted into the insertion port 3 based on a detected result of the card insertion sensor 11 and, in addition, when movement of a person in front of the card reader 1 is not detected based on a detected result of the infrared sensor 12, the card 2 may be inserted to a rear end of the inside of the card reader 1. In this case, it may be structured that the card passage is closed by the pulling-out prevention lever 6 so that the card 2 having been inserted to the rear end of the inside of the card reader 1 is not pulled out. Also structured as described above, phishing is capable of being prevented.

In the embodiment described above, the card reader 1 is a manual type card reader. However, the card reader to which at least an embodiment of the present invention is applied may be a card conveyance type card reader having a conveying mechanism for a card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card, the card reader comprising:
    a card insertion part comprising an insertion port for the card; and
    an infrared sensor structured to detect a human body and detect movement of a person in front of the card reader;
    wherein when an inserting direction side of the card inserted into the insertion port is referred to as a rear side and an opposite side to the inserting direction side of the card is referred to as a front side, the card insertion part comprises a cut-out part which is cut out toward the rear side from a front end of the card insertion part;
    wherein the infrared sensor is disposed so as to face the cut-out part;
    wherein the card reader comprises a detection area of the infrared sensor which is enlarged toward a front side of the cut-out part, and the detection area of the infrared sensor is restricted at least in the right or left direction in the card width direction by a part of the cut-out part.

2. The card reader according to claim 1, wherein the infrared sensor is a far-infrared sensor.

3. The card reader according to claim 2, wherein the infrared sensor is disposed so as to face a rear end of the cut-out part.

4. The card reader according to claim 2, wherein
    the card insertion part comprises two protruded parts protruding toward the front side, the two protruded parts are separately formed from each other with a space therebetween in a width direction of the card which is perpendicular to a thickness direction of the card and an inserting direction of the card inserted into the insertion port, and the cut-out part is formed between the two protruded parts.

5. The card reader according to claim 2, further comprising a control section which is connected with the infrared sensor, wherein the control section is configured to detect the movement of the person in front of the card reader based on a variation amount, determined at predetermined intervals, of infrared rays received by the infrared sensor.

6. The card reader according to claim 2 further comprising:

a shutter mechanism structured to close the card passage where the card is passed; and a control section with which the infrared sensor and the shutter mechanism are connected, wherein the control section is configured to control the shutter mechanism based on a detected result of the infrared sensor.

7. The card reader according to claim 6, further comprising an insertion detection mechanism structured to detect that the card is inserted into the insertion port, wherein the insertion detection mechanism is connected with the control section, wherein the shutter mechanism is configured such that, in a standby state before the card is inserted into the insertion port, the shutter mechanism closes the card passage, and wherein the control section is configured such that, when the control section detects that the card is inserted into the insertion port based on a detected result of the insertion detection mechanism and that the movement of the person in front of the card reader is detected based on a detected result of the infrared sensor, the control section releases a closing state of the card passage by the shutter mechanism and opens the card passage.

8. The card reader according to claim 1, wherein the infrared sensor is disposed so as to face a rear end of the cut-out part.

9. The card reader according to claim 8, wherein the card insertion part is formed with two protruded parts protruding toward the front side, the two protruded parts are separately formed from each other with a space therebetween in a width direction of the card which is perpendicular to a thickness direction of the card and an inserting direction of the card inserted into the insertion port, and the cut-out part is formed between the two protruded parts.

10. The card reader according to claim 9, further comprising:

a shutter mechanism structured to close the card passage where the card is passed; and a control section with which the infrared sensor and the shutter mechanism are connected, wherein the control section is configured to control the shutter mechanism based on a detected result of the infrared sensor.

11. The card reader according to claim 1, wherein the card insertion part is formed with two protruded parts protruding toward the front side, the two protruded parts are separately formed from each other with a space therebetween in a width direction of the card which is perpendicular to a thickness direction of the card and an inserting direction of the card inserted into the insertion port, and the cut-out part is formed between the two protruded parts.

12. The card reader according to claim 11, further comprising:

a shutter mechanism structured to close the card passage where the card is passed; and a control section with which the infrared sensor and the shutter mechanism are connected, wherein the control section is configured to control the shutter mechanism based on a detected result of the infrared sensor.

13. The card reader according to claim 12, further comprising an insertion detection mechanism structured to detect that the card is inserted into the insertion port, wherein the insertion detection mechanism is connected with the control section, wherein the shutter mechanism is configured such that, in a standby state before the card is inserted into the insertion port, the shutter mechanism closes the card passage, and wherein the control section is configured such that, when the control section detects that the card is inserted into the insertion port based on a detected result of the insertion detection mechanism and that the movement of the person in front of the card reader is detected based on a detected result of the infrared sensor, the control section releases a closing state of the card passage by the shutter mechanism and opens the card passage.

14. The card reader according to claim 1, further comprising a control section which is connected with the infrared sensor, wherein the control section is configured to detect the movement of the person in front of the card reader based on a variation amount, determined at predetermined intervals, of infrared rays received by the infrared sensor.

15. The card reader according to claim 14, further comprising:

a shutter mechanism structured to close the card passage where the card is passed; and a control section with which the infrared sensor and the shutter mechanism are connected, wherein the control section is configured to control the shutter mechanism based on a detected result of the infrared sensor.

16. The card reader according to claim 1, further comprising:

a shutter mechanism structured to close the card passage where the card is passed; and a control section with which the infrared sensor and the shutter mechanism are connected, wherein the control section is configured to control the shutter mechanism based on a detected result of the infrared sensor.

17. The card reader according to claim 16, further comprising an insertion detection mechanism structured to detect that the card is inserted into the insertion port, wherein the insertion detection mechanism is connected with the control section, wherein the shutter mechanism is configured such that, in a standby state before the card is inserted into the insertion port, the shutter mechanism closes the card passage, and wherein the control section is configured such that, when the control section detects that the card is inserted into the insertion port based on a detected result of the insertion detection mechanism and that the movement of the person in front of the card reader is detected based on a detected result of the infrared sensor, the control section releases a closing state of the card passage by the shutter mechanism and opens the card passage.

18. A card reader for use with a card by a user, the card reader comprising:
a card insertion part comprising an insertion port for a card; and
an infrared sensor structured to detect a human body detect movement of a person in front of the card reader;
wherein when an inserting direction side of the card inserted into the insertion port is referred to as a rear side and an opposite side to the inserting direction side of the card is referred to as a front side, the card reader comprises a protruded part which is provided on at least one end side of the card insertion part in a card width direction perpendicular to an inserting direction of the card and is protruded toward the front side of the card insertion part,
wherein the protruded part forms a holding space for holding the card by the user of the card reader, and
wherein the card reader comprises a detection area of the infrared sensor which is enlarged toward a front side of the holding space, and the detection area of the infrared sensor is restricted at least in the right or left direction by the protruded part on at least one end side of the card insertion part in the card width direction.

19. The card reader according to claim 18, wherein
the protruded part is formed on both end sides of the card insertion part in the card width direction, and
the detection area of the infrared sensor is restricted by the protruded parts on both end sides of the card insertion part in the card width direction.

20. The card reader according to claim 18, further comprising:
an insertion detection mechanism structured to detect that the card is inserted into the insertion port; and
a control section connected with the infrared sensor and the insertion detection mechanism,
wherein the control section is configured to detect the movement of the person in front of the card reader based on a variation amount, determined at predetermined intervals, of infrared rays received by the infrared sensor,
wherein the control section is configured to determine that a foreign matter covering the holding space is exists in a case that, when the control section detects that the card is inserted into the insertion port based on a detected result of the insertion detection mechanism, the control section does not detect the movement of the person in front of the card reader based on a detected result of the infrared sensor.

* * * * *